(12) United States Patent
Drozd et al.

(10) Patent No.: US 12,063,241 B2
(45) Date of Patent: Aug. 13, 2024

(54) ZERO TRUST ARCHITECTURE FOR NETWORKS EMPLOYING MACHINE LEARNING ENGINES

(71) Applicant: ANDRO Computation Solutions, LLC, Rome, NY (US)

(72) Inventors: Andrew Louis Drozd, Rome, NY (US);
Jithin Jagannath, Oriskany, NY (US);
Anu Jagannath, Oriskany, NY (US);
Keyvan Ramezanpour, New Hartford, NY (US)

(73) Assignee: ANDRO COMPUTATIONAL SOLUTIONS, LLC, Rome, NY (US)

( * ) Notice: Subject to any disclaimer, the term of this patent is extended or adjusted under 35 U.S.C. 154(b) by 256 days.

(21) Appl. No.: 17/724,071

(22) Filed: Apr. 19, 2022

(65) Prior Publication Data
US 2022/0345484 A1 Oct. 27, 2022

Related U.S. Application Data

(60) Provisional application No. 63/177,636, filed on Apr. 21, 2021.

(51) Int. Cl.
*H04L 9/40* (2022.01)
*G06N 3/08* (2023.01)

(52) U.S. Cl.
CPC .......... *H04L 63/1433* (2013.01); *G06N 3/08* (2013.01); *H04L 63/10* (2013.01)

(58) Field of Classification Search
CPC ........ H04L 63/1433; H04L 63/10; G06N 3/08

USPC .......................................................... 726/25
See application file for complete search history.

(56) References Cited

U.S. PATENT DOCUMENTS

| | | | | |
|---|---|---|---|---|
| 10,685,347 | B1* | 6/2020 | Edwards | G06F 21/36 |
| 11,563,764 | B1* | 1/2023 | Hoscheit | H04L 63/1433 |
| 2008/0016569 | A1* | 1/2008 | Hammer | G06F 21/554 |
| | | | | 726/23 |
| 2015/0304343 | A1* | 10/2015 | Cabrera | G06F 21/50 |
| | | | | 726/23 |
| 2018/0278647 | A1* | 9/2018 | Gabaev | H04L 63/1425 |
| 2019/0354983 | A1* | 11/2019 | Yu | G06Q 20/3224 |
| 2020/0274894 | A1* | 8/2020 | Argoeti | H04L 63/1433 |

* cited by examiner

*Primary Examiner* — Badri Narayanan Champakesan
(74) *Attorney, Agent, or Firm* — Hoffman Warnick LLC

(57) ABSTRACT

A system for governing access to a network environment, including: at least one communication node communicatively coupled to a network infrastructure; a network assurance agent configured to monitor the at least one communication node, wherein the network assurance agent performs actions including: generating, in response to an access request for a network resource from the at least one communication node, an environmental model of the at least one communication node relative to the network environment, wherein the environmental model includes operational data of the at least one communication node or at least one other communication node in the network environment, calculating a risk score for the at least one communication node via a machine learning algorithm, based on the environmental model, and granting or denying the access request based on the risk score.

16 Claims, 8 Drawing Sheets

ZERO TRUST ARCHITECTURE FOR NETWORKS EMPLOYING MACHINE LEARNING ENGINES

BACKGROUND

1. Technical Field

The present disclosure relates to networking architecture. Specifically, embodiments of the disclosure provide a zero trust architecture (ZTA) for networks employing machine learning engines.

2. Background Art

Wireless communication has enabled development of emerging technologies such as autonomous vehicles, vehicle to everything (V2X) networks, smart cities, and internet of things (IoT). Fifth generation (5G) networks provide a massive volume of heterogeneous devices with seamless connectivity and computational resources for autonomous and intelligent operation. Further, sixth generation (6G) networks and beyond are expected to incorporate more agile radio environments, including satellite and unmanned aerial vehicle (UAV) communications, to provide a three-dimensional (3D) radio. However, traditional network security frameworks have obvious weaknesses in providing security assurance in such a complex and dynamic network environment.

Traditional network security models assume a network perimeter, as a trust zone, which is protected against unauthorized access. Any subject operating in the trust zone, after appropriate authentication and authorization, is deemed trusted. However, due to agile radio environments, mobility, and heterogeneity of next generation tactical networks, identification of the network perimeter is challenging if not impossible. More importantly, such models allow lateral movement of subjects in the trust zone after authentication.

The third generation partnership project (3GPP) has developed enhanced security frameworks specifically designed for 5G network architecture. These frameworks introduce several security levels for various network functions including network access, network/user/application domains, and service based architecture (SBA) security. The frameworks incorporate appropriate authentication, authorization, and key agreement (AKA) protocols for security of various technologies. Such technologies include device-to-device (D2D) and vehicle-to-everything (V2X) communications, software defined networking (SDN), and network function virtualization (NFV) in beyond 5G environments.

Most existing security protocols assume a strong trust relationship among network entities and services providing authentication and authorization. Such assumptions can lead to serious security vulnerabilities. These vulnerabilities may be exploited to deploy privacy, denial-of-service (DoS), man-in-the-middle, and impersonation attacks.

Zero trust architecture (ZTA) is a solution to address security requirements in a network with untrusted infrastructure. A ZTA provides network assurance under the assumption that no subject requesting access to the network resources can be trusted even after initial authentication and authorization. Every access request is individually authorized and monitored during the access period for compliance with security policy rules. A dynamic trust evaluation for every access request is the key tenet of zero trust (ZT). In other words, authorizing the individual access requests by a subject rather than authorizing the subject requesting access is a key tenet of ZTA.

SUMMARY

The illustrative aspects of the present disclosure are designed to solve the problems herein described and/or other problems not discussed.

Embodiments of the disclosure provide a system for governing access to a network environment, the system including: at least one communication node communicatively coupled to a network infrastructure; a network assurance agent configured to monitor the at least one communication node, wherein the network assurance agent performs actions including: generating, in response to an access request for a network resource from the at least one communication node, an environmental model of the at least one communication node relative to the network environment, wherein the environmental model includes operational data of the at least one communication node or at least one other communication node in the network environment, calculating a risk score for the at least one communication node via a machine learning algorithm, based on the environmental model, and granting or denying the access request based on the risk score.

Embodiments of the disclosure further provide a method for governing access to a network environment including at least one communication node communicatively coupled to a network infrastructure, including: generating, in response to an access request for a network resource from the communication node, an environmental model of the at least one communication node relative to the network environment, wherein the environmental model includes operational data of the at least one communication node or at least one other communication node in the network environment; calculating a risk score for the at least one communication node via a machine learning algorithm, based on the environmental model; and granting or denying the access request based on the risk score.

DETAILED DESCRIPTION

Figure 1:
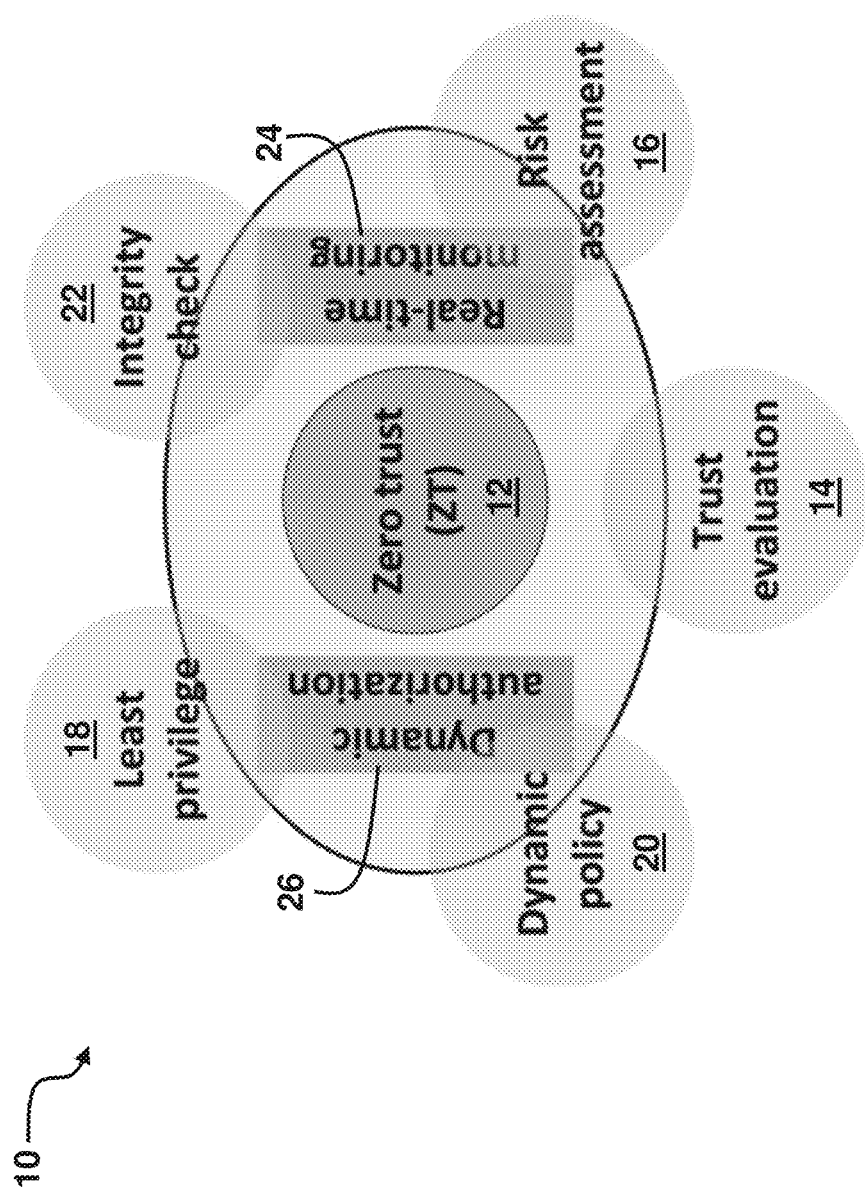
FIG. 1 shows an illustrative diagram of zero trust principles for information security in untrusted networks.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Dynamic risk assessment and trust evaluation are elements of a zero trust architecture (ZTA). Embodiments of the disclosure provide an intelligent ZTA (i-ZTA), which provides a framework to employ artificial intelligence (AI) engines for information security in untrusted networks. Embodiments of the disclosure demonstrate the adaptability of an open radio access network (O-RAN) for integration of such i-ZTA. The multi-access edge computing (MEC) technology of 5G networks can be exploited to provide resource-constrained devices with the necessary computational resources for realizing the i-ZTA.

While network virtualization, software-defined networking (SDN), and service based architectures (SBA) are often features of 5G networks, operating in untrusted environments has also become an expected feature of the networks. Further, seamless connectivity to a high volume of devices in multi-radio access technology (RAT) has broadened the attack surface on information infrastructure. Network assurance in a dynamic untrusted environment calls for revolutionary architectures beyond existing static security frameworks. Embodiments of the disclosure provide an architectural design of an i-ZTA upon which modern AI algorithms can be developed to provide information security in untrusted networks. Exemplary AI engines can be implemented to realize zero trust (ZT) principles.

According to embodiments of the disclosure, ZT principles are described such as real-time monitoring of the security state of network assets, evaluating the risk of individual access requests, and deciding on access authorization using a dynamic trust algorithm (e.g., MED components). The architecture adapts an SBA-based design, similar to the 3GPP specification of 5G networks, by leveraging the open radio access network (O-RAN) architecture with appropriate real-time engines and network interfaces for collecting necessary machine learning data. The i-ZTA also exploits the MEC technology of 5G to enable intelligent MED components for resource-constraint devices.

Ubiquitous connectivity through 5G networks is perceived by the U.S. Department of Defense (DoD) as a critical strategic technology that provides nations with long-term economic and military advantages. Next generation networks are especially important for mission-critical communications and tactical edge networks (TEN), involving a large volume of heterogeneous and resource-constrained devices. Next generation networks provide necessary computational resources (e.g., through cloud computing) and seamless, reliable, and robust connectivity through a wide range of new radio access technologies (RAT), including satellites, unmanned aerial vehicles (UAVs), device-to-device (D2D), and massive beamforming communications.

The deployment of a TEN, based on next generation networks (e.g., 5G/6G), is cost-effective (both in terms of capital expense and operational expense) while also programmable based on the needs of the particular environment. Hence, the deployment time of TEN with varying environmental needs is reduced significantly. However, perimeter-based security models exhibit weaknesses in providing network assurance in a heterogeneous and dynamic network environment.

Even if perimeter security frameworks provide carefully tailored protocols for various functions of 5G networks (such as the 3GPP 5G security framework), the static nature of such perimeter security frameworks still allows lateral movements in the network perimeter. Either due to internal human errors, social engineering attacks, or the high mobility of 5G networks, an authenticated subject (which is trusted) can acquire access to unauthorized sensitive resources. Hence, according to embodiments of the disclosure, i-ZTA is designed to provide secure communication and data sharing from core 5G to tactical edge networks.

The main tenets of zero trust (ZT) are outlined in the special publication 800-27 of the U.S. National Institute of Standards and Technology (NIST). ZT principles 10 are summarized in FIG. 1 and explained below.

Zero Trust 12: All network assets and functions, including multiple devices communicating data, computing resources and services, are considered untrusted irrespective of their location in the network. Hence, all communications must meet the same security requirements as third parties requesting access to the network.

Trust Evaluation 14 and risk assessment 16: Trust evaluation and risk assessment are conducted for every access request. The assessment is carried out continuously (during the period of the access) and dynamically (based on situational conditions of the requesting subject and the involved network assets).

Least Privilege 18: Any access, if granted, should be authorized with the least privileges necessary for the task. An access is only granted for a specific resource (depending on the sensitivity of the resource) and is not valid for a different resource.

Dynamic Policy 20: A dynamic policy is necessary for making a decision on granting an access. The decision factors may include security state (credentials, software version/patches, location, etc.) and behavioral attributes of the subject and network assets (e.g., information collected from an integrity check).

Integrity Check 22: The security state of all network assets and requesting subjects are monitored continuously and preferably in real-time, e.g., by a continuous diagnostic and mitigation (CDM) system. The security posture of devices (e.g., software versions/patches, dynamic security analytics) as well as the behavioral patterns of users/devices/network assets are evaluated with an automated CDM system in terms of compliance with security policy rules.

Realization of ZT principles with static policies is overwhelming and challenging. Automated real-time monitoring 24 and dynamic security evaluation and authorization 26 are features of a ZTA. With a growing volume of users requiring access to network resources, the ZTA components deal with a large amount of data. Hence, intelligent monitoring, evaluation, and decision making (MED), using artificial intelligence (AI), are the enablers of ZTA in the next generation networks.

Figure 2:
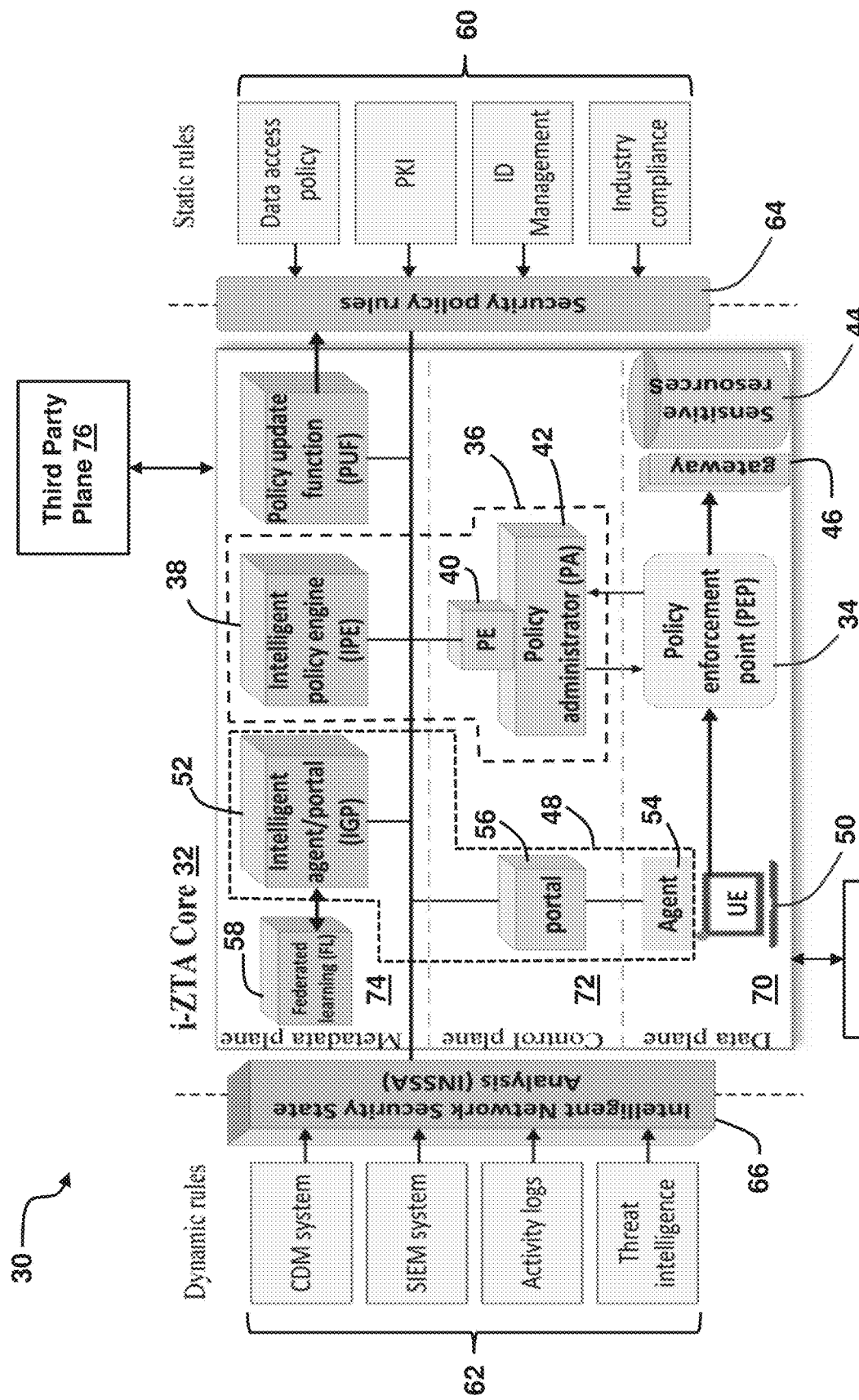
FIG. 2 shows a schematic view of an intelligent zero trust architecture (i-ZTA) with static security policy rules and artificial intelligence (AI) engines for monitoring, evaluating, and decision making according to embodiments of the disclosure.

Illustrative MED components of an i-ZTA 30 according to embodiments of the disclosure are illustrated in FIG. 2. The locations of different blocks in FIG. 2 reflect the logical interaction of the components and do not necessarily depict their physical locations in the network.

According to embodiments of the disclosure, the following terminology is used when referring to the i-ZTA 30. A subject 2 is any user, application, or service requesting access to a network resource. To this extent, a subject 2 may be considered as a communication node in the network that is requesting access to a network resource. Network assets refer to all devices, network infrastructure, and functions (including cloud services) that are involved in the communication. The network resources are assumed to contain sensitive information that must be protected against unauthorized access. The network assets and network resources may also be considered as communication nodes in the network.

The i-ZTA 30 includes an i-ZTA core 32. The i-ZTA core 32 may include a policy enforcement point (PEP) 34 and policy decision point (PDP) 36, which includes an intelligent policy engine (IPE) 38, a processing engine (PE) 40, and a policy administrator (PA) 42. According to embodiments of the disclosure, as will be described in greater detail below, the IPE 38 of the PDP 36 is configured to provide the PE 40 and PA 42 of the PDP 36 with a risk score (e.g., which may be a continuous scale in the range 0 to 1) associated with an access request from a subject 2 for a sensitive network resource 44, using data collected and analyzed using appropriate artificial intelligence (AI) engines. The IPE 38 may use all available internal and external information about the security state of the subject 2 and the network environment to assign the risk score for granting or denying the subject 2 access to the requested network resource 44. This risk score is sent from the IPE 38 to the PE 40 and PA 42. The PE 40 and PA 42 of the PDP 36 make the decision on granting or denying access to the requested network resource 44 based on the risk score received from the IPE 38. The decision on granting or denying access to the requested network resource 44 provided by the PE 40 and PA 42 may also be based on other information including, for example, the sensitivity of the network resource 44, the quality-of-service (QoS) demand, and the network connections available to the subject 2. The decision on granting or denying access to the network resource 44 is sent to the PEP 34. The PEP 34 is the first point of contact for a subject 2 requesting access to a requested network resource 44. The PEP 34 also establishes the connection between the subject 2 and the network resource 44, if the subject 2 is granted access to the network resource 44.

The PEP 34 may include a gateway 46, which may be considered to be a firewall that implements security measures for controlling access to network resources 44. The gateway 46 may be a software agent, deployed on servers, or hardware equipment, such as network firewalls, at the resource endpoint. The PEP 34 complements the function of the gateway 46 in including configuration commands and access privileges as determined by the IPE 38, PE 40, and PA 42 of the PDP 36. The PEP 34 also establishes a common interface between an intelligent agent/portal (IGP) 48 (described below) and the gateway 46.

The i-ZTA core 32 may provide user equipment (UE) 50 of the subject 2 with a trust evaluation mechanism using the IGP 48, which includes an IGP core 52, agent 54, and portal 56. The IGP 48 may be implemented in a distributed architecture with components including AI engines deployed on the IGP core 52, agent 54, and portal 56. The agent 54 may be a lightweight software module, for example, supported by a hardware accelerator, on the UE 50, that is configured to analyze network traffic targeting the UE 50 and evaluate the trust for the network environment. The portal 56 may also implement a similar data and security analysis engine as the agent 54 for resource-constraint or legacy devices that lack an implementation of the agent 54. The portal 56 may also complement the trust evaluation engine of the agent 54 with high performance AI engines running on i-ZTA servers or cloud platforms. The portal 56 may further coordinate with a federated learning (FL) module 58.

The i-ZTA core 32 may employ the FL module 58 to aggregate the learning experiences of multiple IGPs 48 distributed over multiple UEs 50 (e.g., the agent 54 on each UE 50) and the portal 56, potentially available on multiple access points in the network environment. Each IGP 48 evaluates the trust of the network environment based on local observations and the traffic flow of a UE 50. The FL module 58 may aggregate the learning experiences of all distributed IGPs 48, without requiring their local raw data, in order to, for example: 1) provide a broader visibility of the network environment based on the traffic of all UEs 50 to every UE 50; 2) reduce the communication overhead of data collection for analyzing the network environments of the UEs 50; and 3) improve the privacy of UEs 50 by avoiding sharing of their local data at a (logically) central processing unit.

The information used by the i-ZTA core 32 to grant, establish, and monitor a connection to a network resource 44 is provided by several peripheral modules as shown in FIG. 2. These modules are divided into static (e.g., non-real-time) modules 60 (right side of FIG. 2) and dynamic (e.g., real-time) modules 62 (left side of FIG. 2). The static modules 60 may include, for example, a data access policy, public key infrastructure (PKI), identity (ID) management, and industry compliance. The static modules 60, collectively, define the security policy rules 64 for secure communication and integrity check rules. The security policy rules 64 can be dynamically adjusted by the i-ZTA core 32.

The dynamic modules 62 of the i-ZTA 30 may include, for example, a continuous diagnostics and mitigation (CDM) system, a security information and event management (SIEM) system for collecting information on long-term security state and potential attacks, activity logs (e.g., behavioral information on user/network assets and network traffic), and threat intelligence (e.g., for identifying new security vulnerabilities).

The i-ZTA 30 further includes an intelligent network security state analysis (INSSA) engine 66. As described in greater detail herein, the INSSA engine 66 can employ models such as a graph neural network (GNN) 110 (FIG. 4) to help determine the security state of the network. The INSSA engine 66 carries out the risk assessment in accessing a given network resource in the network. The INSSA engine 66 also implements an anomaly detection to identify potential attacks to the network.

The intelligent MED functions are distributed over the static and dynamic peripheral modules 60, 62 and the components of the i-ZTA core 32. In addition to the static and dynamic peripheral modules 60, 62, the PEP 34 and PDP 36 of the i-ZTA core 32 may incorporate appropriate AI engines for realizing some or all of the monitoring, evaluation, and decision making (MED) chain. For example, the IGP 48, which is the AI engine for the PEP 34, provides network assets and network resources with situational awareness. The PE 40 of the PDP 36 makes decisions on granting a subject 2 access to a network resource 44 based on all of the information provided by the INSSA engine 66, IGP 48, and security policy rules 64 defined by the static and dynamic peripheral modules 60, 62. The details of these engines and the corresponding learning algorithms are detailed elsewhere herein.

According to embodiments of the disclosure, the i-ZTA core 32 of FIG. 2 may divide the network into three logical, and possibly physical, planes. Data communication between the subject 2 and network resources 44 is carried out in a data plane 70, which also includes the initial access request by the subject 2 via the UE 50. The PEP 34 and the PDP 36 communicate in a control plane 72 for making decisions and configuring connections. The data plane 70 and the control plane 72 may exist in current 5G network architectures. The third plane of the i-ZTA core 32 is a metadata plane 74, which is used for communicating all data about the subject/network state required by the AI engines in the i-ZTA 30.

Embodiments of the disclosure may also include a fourth plane, called the third party plane (TPP) 76, which can be used for access requests by third party subjects which are not part of the network assets (e.g., third party subjects may include collaborators, contractors, and third party service providers who require access to the network). The TPP 76 may be configured, for example, to help mitigate denial-of-service (DoS) attacks targeting the PEP 34.

Seamless connectivity in beyond 5G networks implies that multiple RAT technologies may be used dynamically in a single data communication session. This enables UEs 50 to connect to the B5G network, and the hosted network resources, through parallel, and potentially simultaneous connections, over 5G base-stations (gNB) and non-3GPP access networks including wireless local area networks (WLAN) and WiFi. The 3GPP 5G architecture defines appropriate internetworking functions for connecting UEs 50 to 5G networks through trusted and/or untrusted WLAN access. Next-generation networks (6G and beyond) are also envisioned to include air-to-ground wireless access through UAVs and satellites. Furthermore, heterogeneous devices, with different security specifications, credentials, privileges, and computing resources may participate in the communication. According to embodiments of the disclosure, the I-ZTA 30 provides real-time monitoring and security evaluation of all devices involved in the communication through different types of RAT.

Next generation network architectures integrate network virtualization functions (NVF) cloud computing for realization of real-time functions for intelligent processing engines, with commercial off-the-shelf hardware. One example is an O-RAN architecture that provides a (near-)real time (RT) (10 milliseconds (ms) to 1 second (s)) RAN intelligent controller (RIC), central units (CUs), distributed units (DUs), and radio units (RUs). According to embodiments of the disclosure, as described in greater detail below with regard to FIG. 7, functions of the i-ZTA 30 may be incorporated into an O-RAN architecture.

Dynamic access in multi-RAT systems also implies a broadened attack surface. Third party devices have now a wider range of access points to the network. Such devices can manipulate authorized UEs 50 to access network resources, or simply promote a hostile network environment to increase the perceived risk of access, hence, forcing the i-ZTA 30 to decline access. Distributed location of network assets and a massive volume of UEs 50 may also facilitate unintrusive precision cyber-attacks, which do not require privileged access to deploy the attack.

Figure 7:
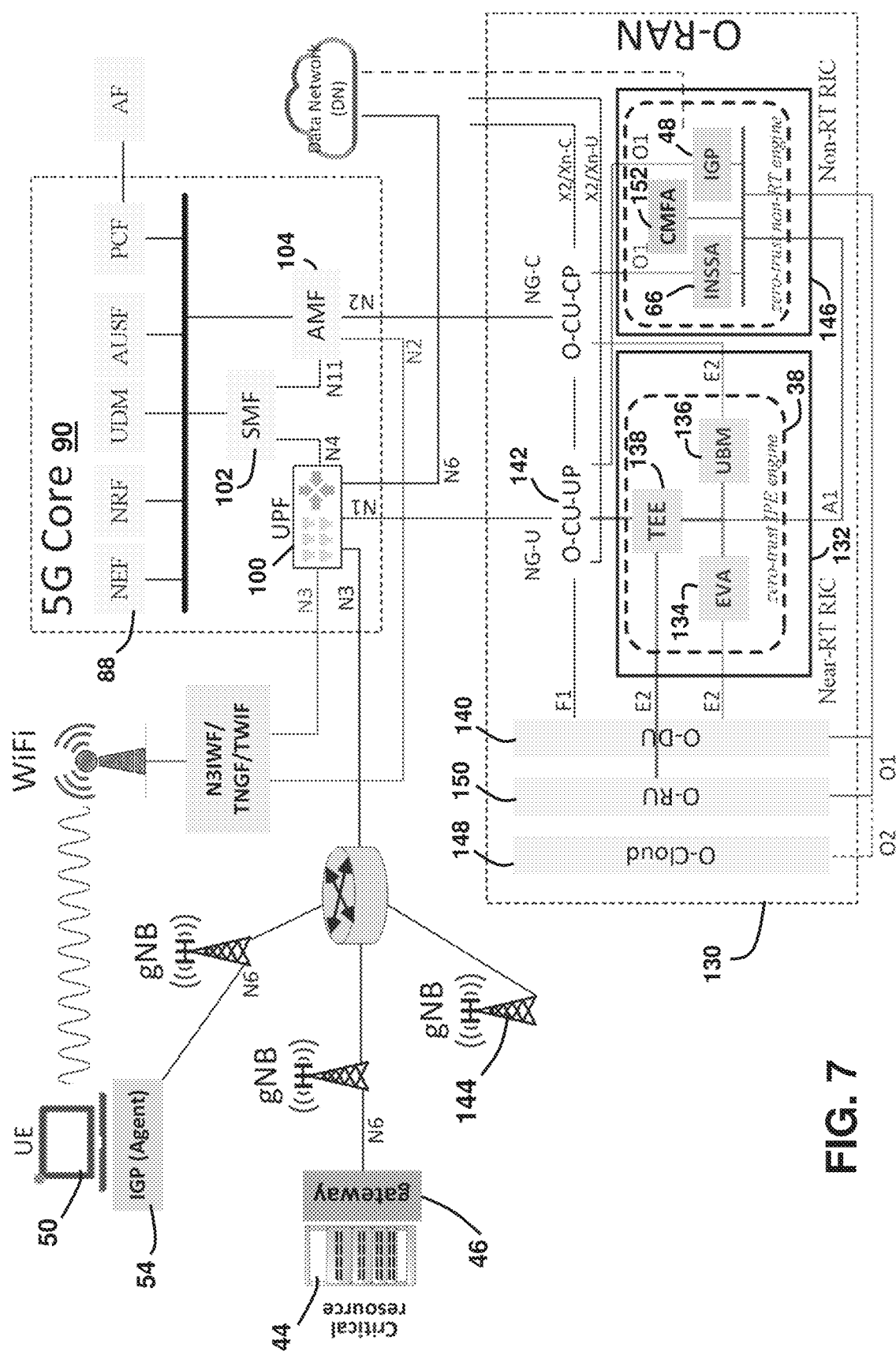
FIG. 7 shows an example of integrating i-ZTA functions within an existing O-RAN without requiring changes in the architecture.

Detection and mitigation of such a broad attack surface requires an analysis of network traffic by the i-ZTA 30, from subjects 2 and UEs 50 to network assets and network resources. This analysis may include collecting a large amount of data in the network. The O-RAN architecture provides an E2 interface to collect data from CU units and DU units (nodes) for monitoring network assets. Also, O1/O2 interfaces may be introduced for collecting machine learning data. Further, remote E2 and O1/O2 interfaces may be provided to facilitate data collection from remote UEs and virtual network functions, potentially deployed on cloud platforms (e.g., O-cloud). The logical connections of the O-RAN components with appropriate interfaces are shown in FIG. 7, described in further detail below. While the use of AI engines and interfaces in 5G architectures is mainly justified for network control and optimization, the deployment of an i-ZTA 30 reveals the need for integration of AI to 5G networks.

A multi-RAT network and D2D communications allow attackers to exploit UEs 50 without intrusion into the network. Hence, according to embodiments of the disclosure, the i-ZTA 30 requires all authorized devices to dynamically monitor their network environment for potential risks, as part of the intelligent MED. One concern, however, is the limited computational resources of UEs 50, especially IoT nodes and sensor devices. Multi-access edge computing (MEC) in 5G networks can be leveraged to address this issue.

The MEC is a prominent example demonstrating the unique capabilities of 5G networks, which brings the computing resources as close as possible to the network edge. Hence, a high volume of devices, possibly with high mobility, may have access to high performance computing resources with low-latency connectivity. The MEC adapts a similar service based architecture (SBA) of 5G networks according to 3GPP specifications. The deployment of MEC can be considered as a mapping onto a network application function (AF) interacting with other network core functions.

The European Telecommunications Standards Institute (ETSI) divides the MEC architecture into two logical partitions including system-level and host-level functions. The latter (MEC host) is deployed in a distributed architecture on the edge cloud and supports user demands for computing platforms. The former (MEC system) includes functional entities (FE) that interact with the 5G core network functions (NF). The main FE in the MEC system is the MEC orchestrator that manages the computing resources and operations of distributed MEC hosts. The MEC host includes the MEC platform, applications, and services. The MEC platform includes application functions (AF) that interact with 5G core NFs. It also includes services that support users' computing requirements. The MEC applications are software modules that deploy and execute users' functions. The services provided to users by a MEC host can either be implemented as a platform service or via MEC applications. The operations support system (OSS) is the bridge between MEC applications and the MEC system without interfering with the 5G network integration.

Figure 3:
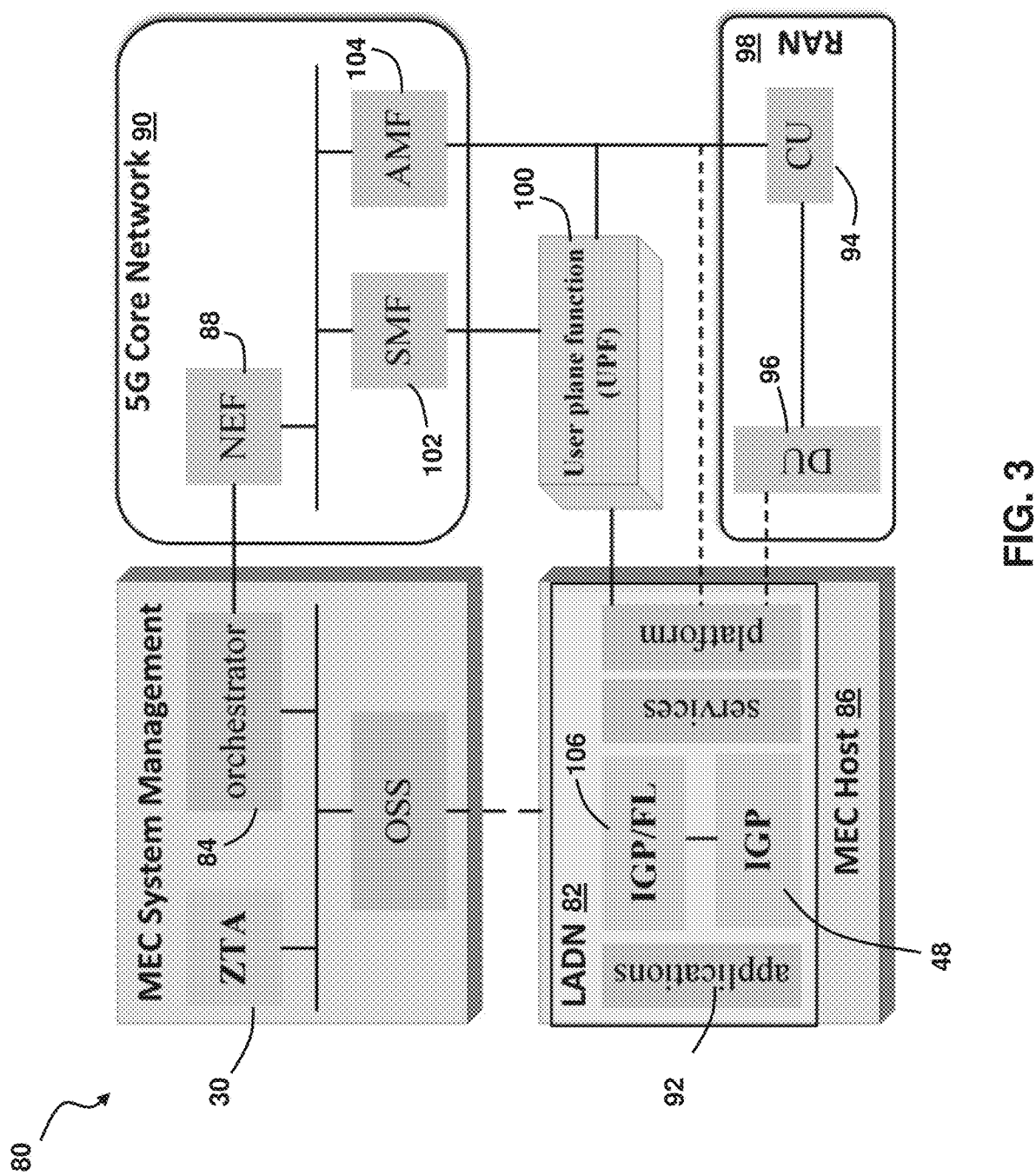
FIG. 3 shows a schematic view of a multi-access edge computing architecture at the edge of a 5G network with a zero trust architecture core, according to embodiments of the disclosure.

An example of MEC architecture 80 deployed in a local area data network (LADN) 82 is shown in FIG. 3. The MEC orchestrator 84 is the centralized application function (AF) for managing the operation of MEC hosts 86. The MEC orchestrator 84 interfaces with a network exposure function (NEF) 88 of the 5G core network 90 for overall management of MEC hosts 86 within the 5G network. It can also be implemented as a 5G AF integrated with the 5G core network 90. A feature of 5G networks enabling the integration of the MEC architecture 80 is the exposure of the 5G core network 90 to the LADN 82. The 5G core network 90 may steer traffic to the applications 92 in the LADN 82, where a MEC host 86 operates.

MEC hosts 86 are deployed at the edge of 5G RAN to minimize latency and improve user QoE. An interesting feature of this architecture is the exposure of MEC hosts 86 to radio information provided by the CUs 94 and DUs 96 of the RAN 98. The MEC architecture 80 may use radio information, e.g., signal power and quality, to further reduce latency by avoiding unnecessary routing traffic via the 5G core network 90. Since the MEC hosts 86 are deployed on an N6 reference point (data network external to the 5G network), they connect to the UEs 50 through a user plane function (UPF) 100. The UPF 100 can be considered as a bridge between the external data network traffic and the user traffic within the 5G network. It is the 5G NF that connects the data plane of the CUs 94 in the 5G RAN 98 to a session management function (SMF) 102 in the 5G core network 90. The SMF 102 creates, manages, and removes users' protocol data unit (PDU) sessions. Further, the control plane of the CUs 94 in the RAN 98 is connected to an access and mobility management function (AMF) 104 of the 5G core 90. The AMF 104 manages the mobility of users, determines appropriate SMFs 102 to serve the connection, and controls the PDU sessions, including security functions (authentication and authorization).

While MEC enables deployment of some intelligent MED components, it is also protected by the i-ZTA 30. The 5G core network 90 may incorporate appropriate functions such as an NEF 88 (e.g., to provide secure access to exposed network services and capabilities of the 5G core network 90), the SMF 102 for policy control (e.g., for traffic steering), and the AMF 104 for unified data management (e.g., for user authentication, authorization and service continuity) to provide untrusted AFs with requested services. While these functions provide static security measures, the i-ZTA 30 (FIG. 2) according to embodiments of the disclosure provides dynamic security measures to authorize accesses to the MEC and monitor the sessions. Further, the IGP 48 on the MEC host 86 implements the functions of the agent 54 and portal 56 of the IGP 48 of the i-ZTA 30, with appropriate AI engines, for the UEs 50. The IGP/FL module 106 in the MEC host 86 also interacts with the FL module 58 of the i-ZTA 30 to report local and receive updated global AI models for the IGP 48.

Referring again to FIG. 2, according to embodiments of the disclosure, the IPE 38 of the ZTA core 32 may employ an AI trust algorithm to authorize access requests for a network resource 44 based on the privileges and security state of the subject 2, security policy rules, the network state, and a score that reflects the confidence level of the access. Specifically, the IPE 38 may employ reinforcement learning (RL) to maximize usability with least privileges. In general, RL is a machine learning training method based on rewarding desired behaviors and/or punishing undesired ones. To this extent, an RL agent is able to perceive and interpret its environment, take actions, and learn through trial and error.

As detailed above, the INSSA engine 66 may employ models such as a graph neural network (GNN) to determine for the security state of the network. The INSSA engine 66 carries out the risk assessment in accessing a given resource in the network and may implement detection to identify potential attacks.

The IGP 48 of the i-ZTZ 30 is an AI engine that is configured to model the security state of a subject 2. The IGP 48 analyzes the security posture of the network traffic to the subject 2 requesting access to a network resource 44 and provides the subject 2 with environmental awareness. A learning objective of the IGP 48 is to keep a high confidence level of the subject 2 in accessing network resources 44 while also providing the subject 2 with an assurance score on the trust of the network environment In various embodiments, the IGP 48 may be deployed in a distributed architecture including three components: the AI engines at the IGP core 52, agent 54, and portal 56. The agent 54 is a lightweight software module, or hardware accelerator, provided on the UE 50 of every subject 2 or network asset requiring access to a network resource 44. The portal 56, e.g., residing on the edge cloud such as MEC platforms, performs a similar task but is intended for resource-constrained devices, such as IoT and sensor devices. The gateway 46 of the PEP 34 is an agent residing in front of the network resource 44 that implements security measures for accessing the network resource 44. The gateway 46 may be legacy or in next-generation firewalls. The gateway 46 directly communicates with the PEP 34 to receive access configuration and privileges for the subject 2. The PEP 34 is directly configured by the PA 42 of the PDP 36. The PEP 34 acts as the bridge between the agent 54, protecting the UE 50, and the gateway 36, protecting the network resource 44.

The agent 54 and the portal 56 incorporate AI algorithms, which are configured to work together in a federated learning approach, as described below.

The environmental awareness (ENA) of a subject 2 may be defined as a tenet of trust evaluation. One role of the IGP 48 is to provide the subjects 2 of a network, which require access to network resources 44, with an ENA score, and a model for the security posture of the network assets. Subjects 2 with higher ENA scores may obtain higher confidence scores in risk assessment by the IPE 38.

The agent 54 may employ a reinforcement learning (RL) engine that conducts several tasks: (1) the RL engine analyzes the traffic of the subject 2 in the network, which provides an initial risk assessment on the network environment; (2) the RL engine learns the flow of unnecessary communication of the subject 2 in the network that may reduce its confidence level in accessing certain resources; and (3) the RL engine provides a model for the communication pattern of the subject 2 which is passed along with an access request to the PEP 34 for overall risk assessment.

The portal 56 may be divided into two components: (1) access request management from resource-constrained devices without computational capability to host the intelligent agent 54, and (2) a learning component that supports federated learning of the agents 54. According to embodiments of the disclosure, the FL engine 58 of the IGP 48 may be used for collaborative and distributed learning of a comprehensive model for the network environment.

As discussed above, each agent 54 may employ RL to learn its network environment and best practices in communicating with network assets and resources. The RL model used by multiple agents 54 can be a common model, trained in the federated learning approach with the several clear advantages.

By aggregating the experience of multiple agents 54, a more comprehensive model of the local network environment is trained by distributed subjects 2. The visibility of individual agents 54 on the network environment is increased, and subjects 2 are provided with a model for the network environment that detects distributed attackers exploiting multiple subjects 2.

Another tenet of trust evaluation is the dynamic risk assessment for every access request for a network resource. In a 5G network, for example, the mobility of heterogeneous devices in a varying environment calls for a dynamic model of the network state that provides information about the risks of accessing a particular network resource by a given subject 2. A graph neural network (GNN) 110 (FIG. 4) may be used to model the state of the 5G network, which is of particular interest in risk assessment by the IPE 38.

Graph neural networks have been shown successful as a scalable approach for resource allocation in large area wireless networks. In these applications, the GNN 110 (FIG. 4) models the channel state between pairs of communicating nodes in the network and one goal is an optimal allocation of spectrum resources to the nodes. The INSSA engine 66 may employ a GNN 110 to model the communication patterns of a 5G network with a goal of assigning risk scores (R-Scores) to the nodes such that the overall metric of security assurance in granting an access is maximized.

According to embodiments of the disclosure, the INSSA engine 66 may employ reinforcement learning to meet several objectives, including, for example: (1) compliance with a set of security policy rules, (2) authorizing accesses with least privileges, and (3) maximizing network usability. The RL algorithm dynamically assigns appropriate scores to all communication nodes in the network so an assurance score (as the reward) is maximized, by inspecting how strictly the policy rules are met by the communication nodes while the network is available to all subjects 2.

Another task of the INSSA engine 66 is anomaly detection. One goal of this task is to detect and prevent potential attacks, such as DoS and distributed DoS (DDoS), that target the PEP 34. Additionally, the INSSA engine 66 protects the network against a more subtle DoS attack which is referred to herein as intelligent DoS (IDoS). As discussed above, the i-ZTA 30 incorporates environmental information of the network to evaluate access requests. A potential attacker can indirectly make the IPE 38 deny access by promoting a hostile network environment, hence increasing the risk of granting the access. The INSSA engine 66 may use a GNN 110 model of the network to detect such activities and potential attacks.

Figure 4:
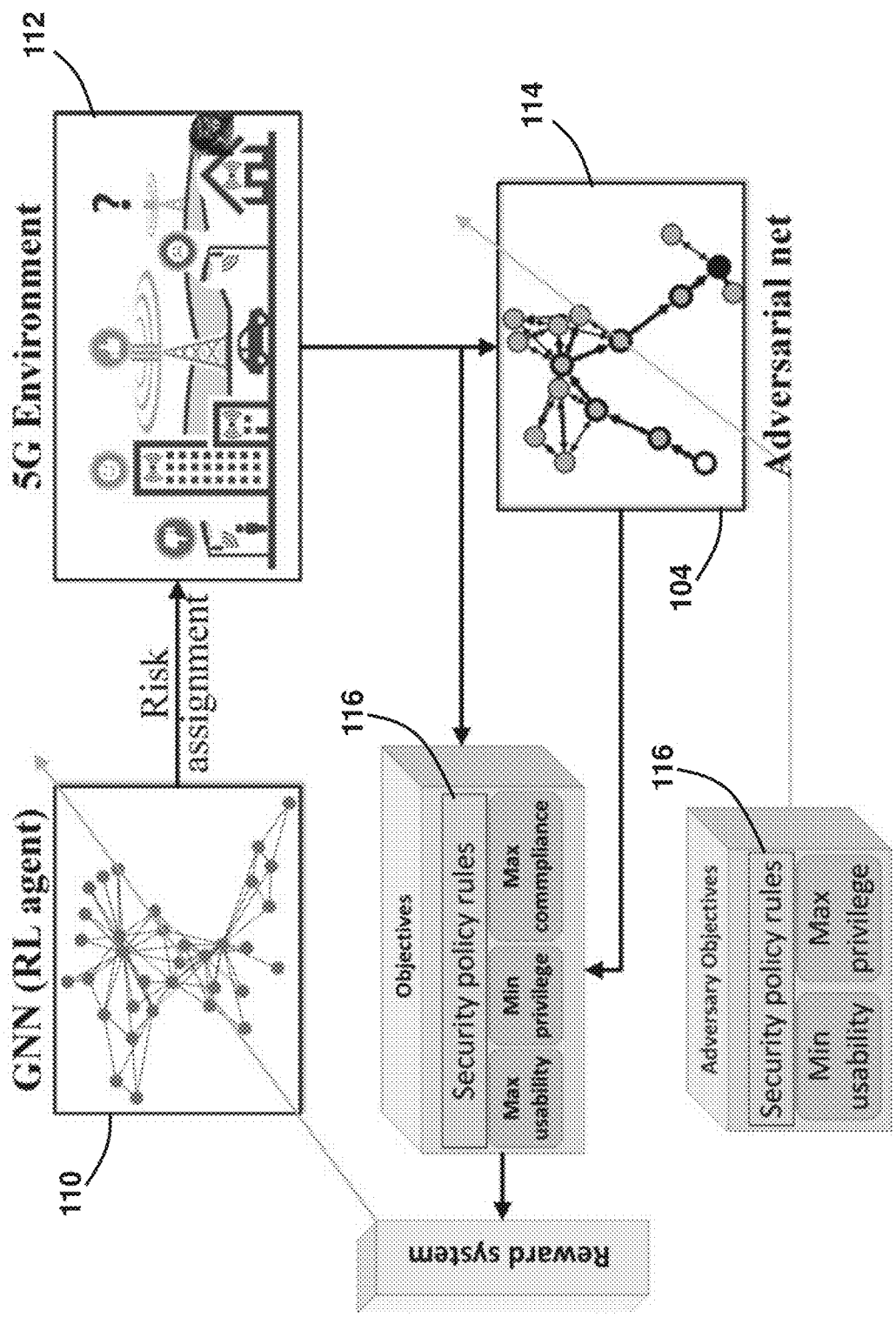
FIG. 4 shows a schematic view of an adversarial learning methodology for network assurance with objectives and compliance with a security policy according to embodiments of the disclosure.

The INSSA engine 66 may follow an adversarial learning approach for risk assessment and anomaly detection. In addition to the node risk scores, the risk of operating in a network environment contributes to the overall network assurance score. The block diagram of FIG. 4 illustrates the flow of the adversarial learning. While the GNN 110 (as the RL agent) attempts to maximize usability of a network environment 112 with least privileges and maximum compliance, an adversarial network 114 is trained with the objective of minimizing network usability and maximizing privileges compliant with security policy rules 116. The result is a GNN model 110 of the network trained to assess the risk of access in the presence of intelligent distributed attackers exploiting network assets.

The endpoint of trust evaluation is the IPE 38 (FIG. 2). Like the IGP 48 and INSSA engine 66, the IPE 38 incorporates an AI engine to make a final decision on granting a requested access to a network resource 44 based on the state of the agent 54 and network. The IPE 38 employs a neural network with long- and short-term memories to evaluate the risk of granting access to an agent 54 based on all previous activities of the agent 54 and the network. The IPE 38 provides a confidence score (C-score) as the confidence-level of the access.

The policy of the IPE 38 is optimized through a RL algorithm to minimize the probabilities of false positives and false negatives. After making a decision (access grant or denial), the IPE 38 monitors the security state of the session (how strictly the agent 54 conforms to the security policy rules). The PA 42 of the PDP 36 provides the IPE 38 with this information. The IPE 38 also receives the future state of the agent 54 from the INSSA engine 66 to evaluate the reward return corresponding to the decision.

The IPE 38 may use the collected information to evaluate the risk of the agent 54 for its future transactions. The memory of IPE policy is a feature for risk assessment. A potential intelligent attacker does not deviate from the security policy rules with observable traces. Rather, a potential attacker attempts to exploit multiple network assets by taking incremental steps toward malicious activities or unauthorized access to sensitive information, distributed over space and time. While spatial security state is modeled by the INSSA engine 66, the IPE 38 provides the temporal model.

The IPE 38 incorporates all previous and future states of the subject 2 and the assets and resources of the network for risk assessment. The learning policy of the IPE 38 may be divided into two sub-components with long- and short-term memories. The short-term memory sub-component allows granting access to agents 54, which have corrected their security state over time. The long-term memory sub-component enables the IPE 38 to detect adversaries exploiting vulnerabilities with incremental steps over time.

Figure 5:
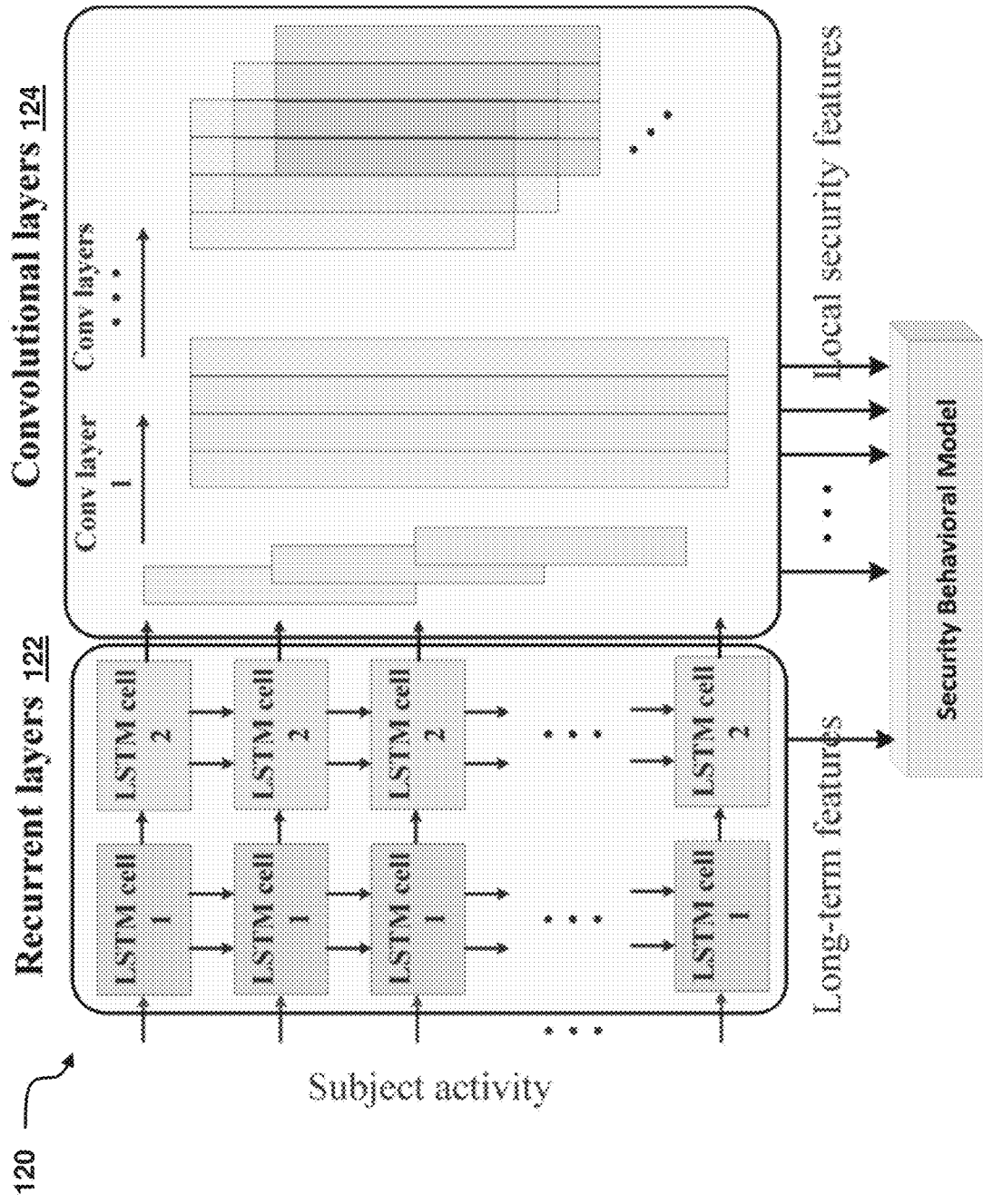
FIG. 5 depicts an example of a neural network for extracting medium-term information, long-term information, and local security features of network activities according to embodiments of the disclosure.

An example concept-level architecture of the IPE neural network (NN) 120 with long- and short-term information is shown in FIG. 5. The NN 120 may include a few recurrent layers 122 followed by convolutional layers 124. It has been demonstrated that a recurrent NN 120, such as long short-term memory (LSTM), is powerful in temporal modelling of a time-series signal and convolutional layers 124 are capable of filtering noisy spectral components and extracting local features of the signal. Hence, the recurrent layers 122 of the NN 120 of the IPE 38 extract temporal information on the security behavior of a subject 2, over medium to long time periods, while the convolutional layers 124 extract local (shorter time periods) security features of the subject 2.

According to embodiments of the disclosure, the components and AI engines described herein work together in a cohesive framework to meet the enhanced security needs of military as well as commercial 5G/6G networks in the future. Using this framework, sensitive applications may benefit from widespread adoptability and low cost deployment of these networks without compromising information security.

Network assurance in untrusted environment of next generation network demands dynamic authorization, risk assessment, and monitoring of network assets. Realization of zero trust (ZT) principles, necessary for providing information security in such environments, require real-time processing of big data. The i-ZTA 30 according to embodiments of the disclosure provides ZT principles by leveraging distinct technologies of 5G networks as the key enablers of the i-ZTA 30.

The i-ZTA 30 adopts an SBA-based design with AI engines for realizing ZT principles in untrusted networks. The i-ZTA core 32 includes the IPE 38 and the IGP 48 for dynamic authorization of access requests. The IPE 38 uses reinforcement learning, with the objective of maximizing an assurance/trust score, and the IGP 48 uses federated learning to provide users with environmental awareness scores (EVA). Dynamic monitoring of the network assets is also realized with the INSSA engine 66 which employs graph neural networks (GNN) for network modeling and adversarial learning for risk assessment.

Figure 6:
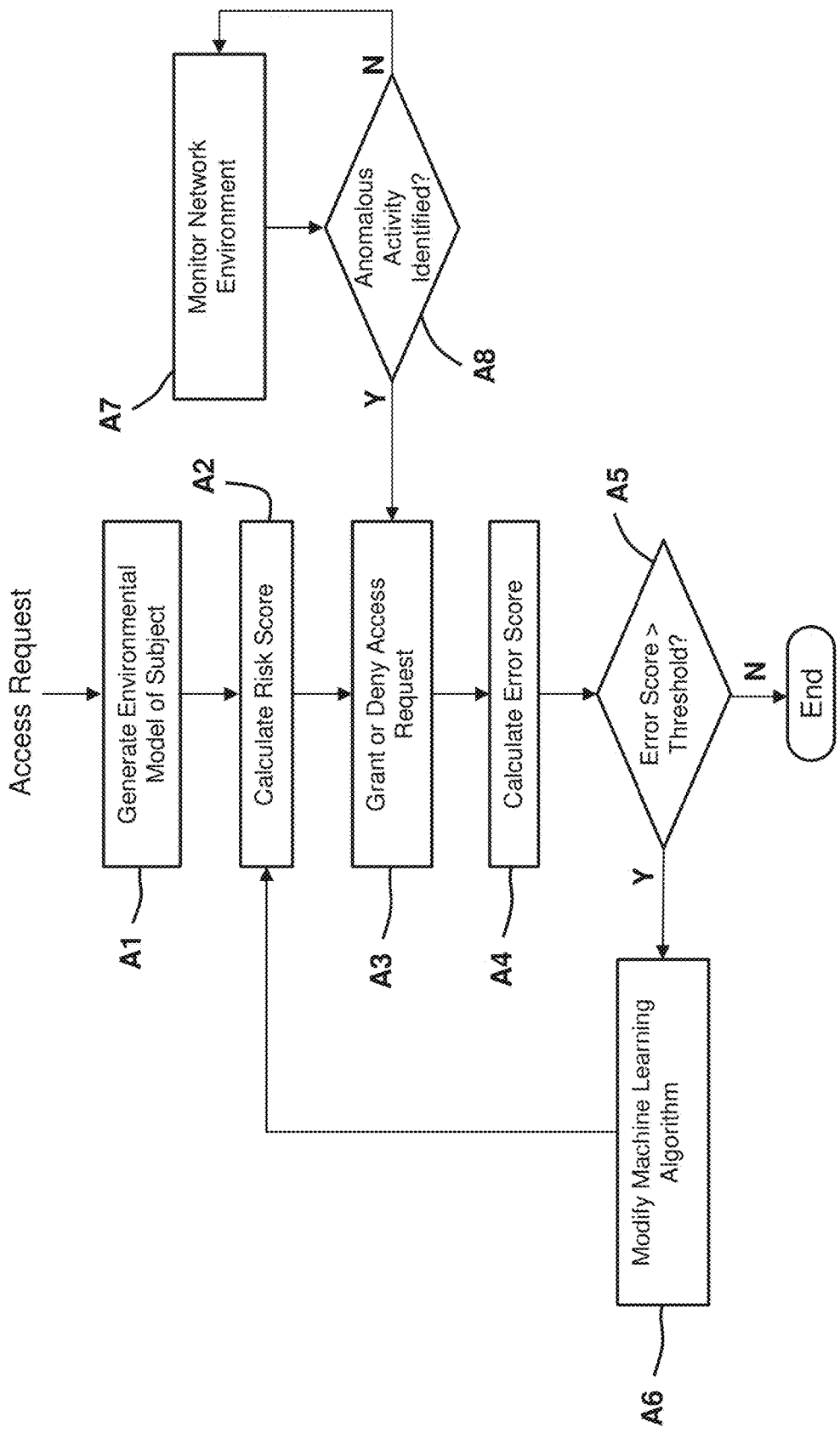
FIG. 6 shows an illustrative flow diagram depicting a process carried out by the i-ZTA of FIG. 2 to establish a communication link between a subject and a requested network resource in a network environment according to embodiments of the disclosure.

FIG. 6 shows an illustrative flow diagram depicting a process carried out by the i-ZTA 30 to establish a communication link between a subject 2 and a requested network resource 44 in a network environment according to embodiments of the disclosure. At process A1, in response to an access request from a subject 2 via a UE 50 (communication node), the IGP 38 of the i-ZTA 30 generates an environmental model of the subject 2 relative to the network environment, where the environmental model includes operational data of the subject 2 or at least one other communication node in the network environment. At process A2, the IPE 38 of the i-ZTA 30 calculates a risk score for the subject 2 using a machine learning algorithm, based on the environmental model provided in process A1. At process A3, the PEP 34 of the i-ZTA 30 grants or denies the access request based on the risk score provided in process A2. At process A4, the IPE 38 of the i-ZTA 30 calculates an error score for the grant or denial of the access request. If the error score exceeds the threshold value (Y at process A5), the machine learning algorithm is modified at process A6. If not (N at process A5), the process ends. At process A7, the INSSA engine 66 of the i-ZTA 30 dynamically and continuously monitors the network environment to identify an anomalous activity in one of the communication nodes in the network environment. If identified (Y at process A8), the anomalous activity may be used in process A3 to grant or deny the subject access to the requested network resource 44.

The architecture of the i-ZTA 30 integrated in an O-RAN architecture 130 is shown in FIG. 7. According to embodiments of the disclosure, the i-ZTA 30 is configured to exploit the real time processing and data collection of the O-RAN architecture 130 for realizing the IPE 38 and AI network state analysis, and the MEC 80 for intelligent agent and portal components of MED. The ORAN architecture 130 further provides appropriate interfaces for near-real time monitoring of remote devices and services.

As depicted in FIG. 3, the agent 54 and portal 56 of the IGP 48 may be deployed as independent applications from the O-RAN architecture 130, on the edge cloud (e.g., MEC 86) for reduced latency and improved user QoE. The FL module 58 collects AI models of all IGPs 48 and provides agents 54 and portals 56 with an improved common model for analyzing network environments. The IGPs 48 analyze network traffic targeting UEs 50 and provide the UEs 50 with a trust score for the network (environmental awareness).

The IPE 38 is the trust evaluation engine within the i-ZTA 30 that controls and authorizes accesses to the 5G network resources. The IPE 38 can either be deployed as a component of a near-real-time (near-RT) RAN controller (RIC) or an independent application interacting with the near-RT RIC over an E2 interface. The IPE 38 collects key performance measurement (KPM) data from radio units (RU), distributed units (DU) and control units (CU) to model the radio environment and assign a trust score to a user session. The PEP 34 monitors the users session and interacts with the CUs to establish, maintain and terminate sessions. The PEP 34 may also be integrated within the near-RT RIC or deployed as an independent application.

The INSSA engine 66 is a security analytics engine the provides trust scores for the overall network environment. It may be deployed as applications within the non-RT RIC of the O-RAN architecture 130 or an independent application on cloud platforms (MEC or fog computing). The INSSA engine 66 collects data about all connections of the UEs 50 to the overall network including the 5G (over 5G basestations or non-3GPP access networks) and external data networks. The INSSA engine 66 interacts with the CUs of the O-RAN architecture 130 to collect the required information. It constructs a model of the overall network that supports the traffic of all UEs 50. The INSSA engine 66 also interacts with the IPE 38 over an A1 interface. The data exchanged in this interaction can be used as enrichment information by the IPE 38 for authorizing accesses to UEs 50.

The architecture of i-ZTA 30 provides the flexibility to integrate functions of the i-ZTA 30 within an existing O-RAN architecture 130 (hereafter O-RAN 130) without requiring changes in the O-RAN 130. An example of integrating functions of an i-ZTA 30 as xApps (applications within a near-RT RAN intelligent controller (RIC) 132) and rApps (applications within a non-RT RIC 146) of the O-RAN 130 is shown in FIG. 7. This architecture may be used to integrate the i-ZTA 30 with an untrusted ($3^{rd}$ party) O-RAN. To verify trustworthiness of the O-RAN components, the i-ZTA 30 may also incorporate a continuous multi-factor authentication (CMFA) engine 152 with functionality described later.

In the i-ZTA 30 deployment of FIG. 7, the IPE 38 is implemented as an xApp within the near-RT RAN RIC 132. The IPE 38 in this case includes three components: 1) environment visibility and analytics (EVA) 134; 2) user behavioral model (UBM) 136; and 3) trust evaluation engine (TEE) 138. The EVA 134, UBM 136, and TEE 138 may be implemented as microservices in the near-RT RIC 132. In short, the EVA 134 and UBM 136 provide information about the radio environment and user network usage, respectively. The TEE 138 uses this information to evaluate the trust for granting access to a network resource 44. The decision is made based on a least privilege policy, user priority, and the sensitivity of the requested resource.

The EVA 134 of the IPE 38 may collect required data over an E2 interface of the O-RAN 130. The EVA 134 subscribes to the distributed units (DUs) 140 of the O-RAN 130 to receive key performance indicators (KPI) on the PHY, MAC, and radio link control (RLC) for specific UEs 50. Metrics collected by the EVA 134 may include, for example, information on channel state and beamforming (e.g., location information of UEs 50), resource utilization (user activity), and link reliability (potential interference). These metrics provide trust engines with a fine-grained visibility on the radio environment for every UE 50.

The UBM 136 in the IPE 38 subscribes to the central units (CUs) 142 of the O-RAN 130 via an E2 interface, to collect information mainly on the traffic patterns. It also uses the KPIs pertinent to resource utilization, throughput, and load of the gNBs 144. The data collected for the gNBs 144 provides information including, for example, the number of users, interference level, and the presence of potential adversaries and jammers. The quality of service (QoS) metrics of the traffic flows, network load, and throughput can be used as indicators of interference and jamming environment but also as metrics for prioritizing UE 50 accesses. The UBM 136 implements AI-based modeling of UE 50 and network traffic patterns. The learned patterns may also be used for event detection, where an event is not necessarily malicious.

As an example, connection of a new UE 50 to the network or handover of existing UEs 50 may be malignant events. However, an unexpected and abrupt change in a user traffic or QoS can be suspicious. The IPE 38 uses the traffic patterns and detected events in granting accesses.

The TEE 138 in the IPE 38 implements the trust evaluation engine. It uses the information and behavioral models provided by the EVA 134 and UBM 136 as part of the features used in decision making. The TEE 138 also collects data about UEs 50 from the IGP 48 via an A1 interface. (As explained below, the IGP 48 is implemented in a non-RT RIC 146.) The IGP 48 provides the TEE 138 with information about user activity in the global network domain including, for example, internet traffic and connections over non-3GPP access (e.g., 5G connection through WiFi access). This information complements the information provided by the EVA 134 and UBM 136 on the user activity over the 3GPP access (gNB) and radio environments. Based on this information, the TEE 138 outputs a soft-decision metric, e.g., a real number in the range 0 (min trust) to 1 (max trust), which also depends on the sensitivity of the requested network resource 44. It further generates a hard decision metric on granting/denying the access. The soft-decision metric can be used in prioritizing accesses in congested conditions with limited physical resource blocks.

It is worth noting that the TEE 138 receives both short-term information (near-RT data over E2 interface) and long-term information (non-RT data over A1 interface) about users and devices for trust evaluation. The EVA 134 and UBM 136 may also implement recurrent neural networks, e.g., long short-term memory (LSTM), to learn a temporal model of data collected over the E2 interface. Hence, the TEE 138 is able to use short-time variations in user activity and its radio environment in addition to longer-term network activity.

The IGP 48 in the i-ZTA 30 deployment of FIG. 7 may be implemented as an rApp in the non-RT RIC 146 within the service management and orchestration (SMO) framework of the O-RAN 130. Some considerations for deploying the IGP 48 in the non-RT domain 146 follow. First, the IGP 48 collects information on user traffic in the global network including data network and non-3GPP access. This information is available in the SMO which hosts the non-RT RIC 146. Second, monitoring network traffic does not require fine time resolution as in the near-RT RIC 132 (e.g., between 10 ms and 1 s). The near-RT resolution is more suitable for packet-level timing and inspection. Third, non-RT operation of the rApp implementing the IGP 48 implies lower communication overhead and online computational requirements for this engine. Hence, the IGP 48 can be hosted on lower complexity computing platforms equipped with general purpose processors.

The IGP 48 subscribes to the CUs 142 of the O-RAN 130 over an O1 interface (and an O2 interface when components of the O-RAN 130 are deployed on the O-Cloud 148) to collect data. It also interfaces with radio units (RUs) 150 and DU units 140 (over O1/O2) mainly for network monitoring and CMFA as described later. The data consumed by the IGP 48 includes, for example, user session management information such as number of sessions, traffic statistics, data network traffic, handover events, and user mobility. The CUs 142 interface with the user plane function (UPF) 100 and the access and mobility management function (AMF) 104 of a 5G core network 90, via N3 and N2 interfaces, respectively. Further, the internetworking functions of 5G (responsible for establishing connections through non-3GPP access networks) interface with the UPF 100 and AMF 104 over N3/N2 interfaces. The internetworking functions defined in the 3GPP standards for 5G networks include the non-3GPP internetworking function (N3IWF), for untrusted WLAN, the trusted non-3GPP gateway function (TNGF), for trusted WLAN, and the trusted WLAN internetworking function (TWIF), for devices without a support for 5G NAS signaling. Hence, the CUs 148 can provide the IGP 48 with required information about users' network activity. As discussed above, the IGP 48 also sends this information, in a compact representation (enrichment information), to the TEE 138 over an A1 interface for trust evaluation.

Another task of the IGP 48 is to provide UEs 50 with a mechanism for network monitoring. The information about user network activity (e.g., sent over an A1 interface) helps the TEE 138 to evaluate the trust of accesses requested by UEs 50. The IGP 48 may also be responsible for providing UEs 50 with a mutual trust evaluation on the network environment. For this task, the IGP 48 collects KPI reports from O-RAN components (RUs 150, DUs 140 and CUs 142) over an O1 interface. The KPIs used for this task may include, for example, registration success rate of slices, integrity KPIs (uplink/downlink latency), slice throughput, upstream/downstream N3 interface and UE throughput. By learning the temporal pattern of the performance metrics, the IGP 48 derives a behavioral model of the network entities (hardware and software components) over time. Based on this model, the IGP 48 provides UEs 50 with an assurance metric (e.g., a real scale between 0 and 1) that indicates trustworthiness of a traffic flow (bearer) to a UE 50.

The functions of the i-ZTA 30 in FIG. 7 provide soft-decision mechanisms for verifying the trust of untrusted ($3^{rd}$ party) network components using a rich amount of data available through the O-RAN interfaces. In addition to these mechanisms, a trust verification mechanism with cryptographic proofs is provided. For this purpose, the i-ZTA 30 may also include a continuous multi-factor authentication (CMFA) engine 152 implemented as a rApp in the non-RT RIC 146 of the O-RAN 130. The CMFA engine 152 is configured to evaluate trust, in a continuous process, at several levels, including, for example: 1) trust between functions of the i-ZTA 30; 2) trust between components of the i-ZTA 30 and components of the O-RAN 130; and 3) trust between the components of the i-ZTA 30 and UEs 50.

The CMFA engine 150 may employ, for example, next hop chaining counter (NCC) parameters along with cryptographic Hash functions to verify liveliness and integrity of different network components and functions. The CMFA engine 152 may trigger authentication requests for every component. Each network component and i-ZTA function may also maintain a local NCC parameter. Upon receiving an authentication request from the CMFA engine 152, an i-ZTA function (xApps corresponding to the IPE 38 and rApps implementing the IGP 48) responds back with the HD5 Hash of its software image and its local NCC. In the authentication request, the CMFA engine 152 also sends the Hash of its own software image with the local NCC of the target function. (The CMFA engine 152 sends the authentication requests over O1 interface to the xApps.) Hence, the target i-ZTA function can also verify the trustworthiness of the requesting CMFA engine 152. This process establishes the trust between i-ZTA functions.

For verifying the trustworthiness of components of the O-RAN 130, the CMFA engine 152 may use any of the IPE 38 xApps or IGP 48 rApps as a bridge to forward authentication requests. It should be noted that all components of the O-RAN 130 (including xApps) support X.509 certificates for authentication. When an IGP 48 rApp receives an authentication request for components of the O-RAN 130 (e.g., RUs 150, CUs 142, or DUs 140), it forwards the request within an ZT-AUTH message over an O1 interface to the target component. This component responds back with the Hash of a shared secret (established during the initial authentication) and its local NCC. (The component also updates its local NCC upon receiving every ZT-AUTH message.) Similarly, the IGP 48 sends authentication requests to IPE 38 xApps through an O1 interface for components of the O-RAN 130. The xApps then forward the request within an ZT-AUTH over an E2 interface to the target component. The rApps and xApps receive the response from the components of the O-RAN 130, integrate the response within the Hash of their own image and local NCC, and forward the entire response to the CMFA engine 152 for verification.

Figure 8:
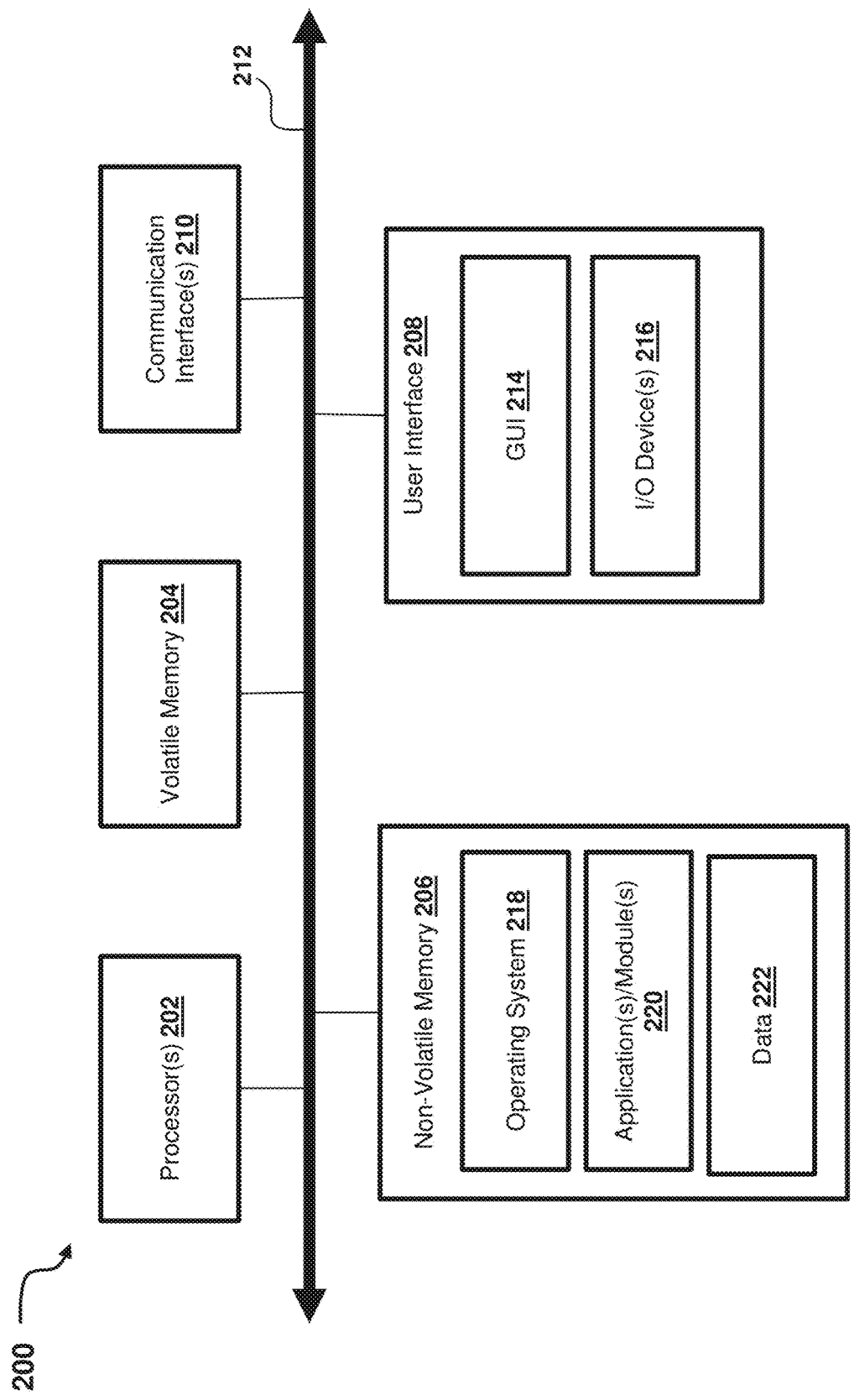
FIG. 8 depicts a computing system according to embodiments of the disclosure.

Turning to FIG. 8, embodiments of the disclosure may be implemented using a computing device 200. The computing device 200 may be integrated into the i-ZTA 30, and/or other components described herein, or may be an independent component connected to one or more of the i-ZTA 30 and/or other components.

The computing system 200 may include one or more processors 202, volatile memory 204 (e. g., RAM), non-volatile memory 206 (e. g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 208, one or more communications interfaces 210, and communication bus 212. The user interface 208 may include a graphical user interface (GUI) 214 (e.g., a touchscreen, a display, etc.) and one or more input/output (I/O) devices 216 (e. g., a mouse, a keyboard, etc.).

The non-volatile memory 206 stores an operating system 218, one or more applications/modules 220 (e.g., static modules 40, dynamic modules 42, IGP 48, IPE 38, INSSA engine 46, PEP 34, etc.) and data 222 such that, for example, computer instructions of operating system 218 and/or applications 220 are executed by processor(s) 202 out of volatile memory 204. Data 222 may be entered using an input device of GUI 214 or received from I/O device(s) 216. Various elements of computing system 200 may communicate via communication bus 212. The computing system 200 as shown in FIG. 8 is shown merely as an example, as the various components described herein may be implemented by any computing or processing environment and with any type of machine or set of machines that may have suitable hardware and/or software capable of operating as described herein.

The processor(s) 202 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. The communications interfaces 210 may include one or more interfaces to enable the computing system 200 to access a network such as a LAN, a WAN, or the Internet through a variety of wired and/or wireless or cellular connections.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified in at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for governing access to a network environment, the system comprising a hardware processor further comprises:
   a plurality of communication nodes communicatively coupled to a network infrastructure;
   a computer system for implementing a network assurance agent configured to monitor the plurality of communication nodes, wherein the network assurance agent performs actions for each communication node of the plurality of communication nodes, including:

generating, in response to an access request for a network resource from the communication node, an environmental model of the communication node relative to the network environment, wherein the environmental model includes operational data of the communication node or at least one other communication node of the plurality of communication nodes in the network environment;

calculating a risk score for the communication node via a machine learning algorithm, based on the environmental model, wherein the machine learning algorithm is included on each communication node of the plurality of communication nodes and the network infrastructure;

granting or denying the access request based on the risk score;

calculating an error score for the granting or denying of the access request; and modifying the machine learning algorithm in response to the error score exceeding a threshold value.

2. The system of claim 1, wherein the network assurance agent is further configured to identify an anomalous activity in at least one communication node of the plurality of communication nodes in the network environment, wherein granting or denying the access request is further based on the identified anomalous activity.

3. The system of claim 1, wherein the machine learning algorithm includes a graph neural network (GNN) for calculating the risk score.

4. The system of claim 1, wherein, for each communication node of the plurality of communication nodes, the machine learning algorithm is further configured to generate the environmental model based on a communication objective of the communication node.

5. The system of claim 1, wherein the network assurance agent is further configured to:

analyze network traffic targeting each communication node of the plurality of communication nodes; and determine a trust score for the network environment, wherein the risk score is at least partially calculated based on the trust value.

6. The system of claim 1, wherein the network infrastructure includes an open radio access network (O-RAN).

7. The system of claim 6, wherein the O-RAN includes a near real-time (RT) RAN intelligent controller (RIC), and wherein the risk score is calculated by a component of the network assurance agent that is deployed in the near-RT RIC controller or as an application interacting with the near-RT RIC controller.

8. The system of claim 7, wherein the O-RAN further includes a non-RT RIC, and wherein the granting or denying of the access request based on the risk score is implemented by a component of the network assurance agent that is deployed in the non-RT RIC controller or as an application interacting with the non-RT RIC controller.

9. The system of claim 1, wherein the network infrastructure includes a multi-access edge computing (MEC) architecture deployed in a local area data network (LADN).

10. A method for governing access to a network environment including a plurality of communication nodes communicatively coupled to a network infrastructure, the method comprising, for each node of the plurality of communication nodes:

generating, in response to an access request for a network resource from the communication node, an environmental model of the communication node relative to the network environment, wherein the environmental model includes operational data of the communication node or at least one other communication node of the plurality of communication nodes in the network environment;

calculating a risk score for the communication node via a machine learning algorithm, based on the environmental model, wherein the machine learning algorithm is included on each communication node of the plurality of communication nodes and the network infrastructure;

granting or denying the access request based on the risk score;

calculating an error score for the granting or denying of the access request; and modifying the machine learning algorithm in response to the error score exceeding a threshold value.

11. The method of claim 10, wherein the method further comprises identifying an anomalous activity in the at least one communication node in the network environment, wherein granting or denying the access request is further based on the identified anomalous activity.

12. The method of claim 10, wherein the machine learning algorithm includes a graph neural network (GNN) for calculating the risk score.

13. The method of claim 10, wherein, for each communication node of the plurality of communication nodes, the machine learning algorithm is further configured to generate the environmental model based on a communication objective of the communication node.

14. The method of claim 10, further comprising:

providing a module on each communication node of the plurality of communication nodes that is configured to:

analyze network traffic targeting the communication node; and determine a trust score for the network environment, wherein the risk score is at least partially calculated based on the trust value.

15. The method of claim 10, wherein the network infrastructure includes an open radio access network (O-RAN), and wherein:

the risk score is calculated by a module that is deployed in a near real-time (RT) RAN intelligent controller (RIC) of the O-RAN or as an application interacting with the near-RT RIC controller.

16. The method of claim 15, wherein the granting or denying of the access request based on the risk score is implemented by a module that is deployed in a non-RT RIC controller of the O-RAN or as an application interacting with the non-RT RIC controller.

* * * * *